US012737732B2

(12) United States Patent
Miller et al.

(10) Patent No.: US 12,737,732 B2
(45) **Date of Patent: *Sep. 15, 2026**

(54) LIFECYCLE MANAGEMENT OF INDUSTRIAL AUTOMATION DEVICES

(71) Applicant: Rockwell Automation Technologies, Inc., Mayfield Heights, OH (US)

(72) Inventors: Scott A. Miller, Oakdale, PA (US); Michael J. Anthony, Milwaukee, WI (US); Adam J. Gregory, Oak Creek, WI (US); Evan J. Kausalik, Appleton, WI (US); Robert J. Koba, Sosnowiec (PL); Randy Scott Oakley, Jr., Waukesha, WI (US); Beniamin J. Skubis, Bukowno (PL); Rudy Zhi Yang, Dalian (CN)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/516,222

(22) Filed: Nov. 21, 2023

(65) Prior Publication Data

US 2024/0086867 A1 Mar. 14, 2024

Related U.S. Application Data

(63) Continuation of application No. 15/923,459, filed on Mar. 16, 2018, now Pat. No. 11,868,970.

(51) Int. Cl.

| | |
|---|---|
| ***G06Q 10/20*** | (2023.01) |
| ***G06Q 10/0631*** | (2023.01) |
| ***G06Q 10/087*** | (2023.01) |

(52) U.S. Cl.

CPC ....... *G06Q 10/20* (2013.01); *G06Q 10/06315* (2013.01); *G06Q 10/087* (2013.01)

(58) Field of Classification Search

CPC ................. G06Q 10/20; G06Q 10/087; G06Q 10/06315; G05B 19/4184; H04L 41/0213; H04L 41/0803

See application file for complete search history.

(56) References Cited

U.S. PATENT DOCUMENTS

| | | | | |
|---|---|---|---|---|
| 7,987,449 | B1 | 7/2011 | Marolia et al. | |
| 8,473,519 | B1 | 6/2013 | Siddiqui et al. | |
| 11,868,970 | B2 * | 1/2024 | Miller | G06Q 10/087 |
| 2004/0044598 | A1 * | 3/2004 | Hosaka | G06Q 10/087 705/28 |

(Continued)

FOREIGN PATENT DOCUMENTS

| | | | | |
|---|---|---|---|---|
| EP | 2 302 478 | A2 | 3/2011 | |
| EP | 2801938 | A1 * | 11/2014 | G05B 13/026 |

(Continued)

OTHER PUBLICATIONS

EP Search Report for EP Application No. 19163018.5, dated Apr. 23, 2019.

(Continued)

*Primary Examiner* — Kelly S. Campen

(74) *Attorney, Agent, or Firm* — Foley & Lardner LLP

(57) ABSTRACT

A method for managing device lifecycles within an industrial automation environment includes receiving a request for lifecycle management data including a scanning configuration, producing configuration data obtained by scanning industrial devices specified by the scanning configuration, receiving lifecycle management data including a lifecycle phase for the industrial devices, generating a graphical representation of the lifecycle phase of the industrial devices, determining an identity of a replacement device for a first industrial device of the industrial devices having a predetermined lifecycle phase, generating a graphical representation of replacement information including the identity of the replacement device, and managing migration (Continued)

to the replacement device by initiating replacement of the first industrial device with the replacement device.

20 Claims, 5 Drawing Sheets

(56) References Cited

U.S. PATENT DOCUMENTS

| | | | | |
|---|---|---|---|---|
| 2007/0186011 | A1 | 8/2007 | Batke et al. | |
| 2010/0165878 | A1 | 7/2010 | Soni | |
| 2013/0151308 | A1* | 6/2013 | Helms | G06Q 10/04 705/7.29 |
| 2014/0336791 | A1* | 11/2014 | Asenjo | G05B 13/026 700/44 |
| 2017/0031667 | A1 | 2/2017 | Haueter et al. | |
| 2017/0353441 | A1 | 12/2017 | Kramarczyk | |

FOREIGN PATENT DOCUMENTS

| | | | |
|---|---|---|---|
| EP | 2 927 854 | A1 | 10/2015 |
| GB | 2 480 942 | A | 12/2011 |
| WO | WO-2018/042940 | A1 | 3/2018 |

OTHER PUBLICATIONS

Preliminary Opinion for EP Application No. 19163018.5, dated Jun. 4, 2024.

Esmaeilian, et al., "The evolution and future of manufacturing: a review," Journal of Manufacturing Systems, 39 (2016), pp. 79-100.

Notice of Allowance for U.S. Appl. No. 15/923,459 dated Oct. 4, 2023.

US Office Action for U.S. Appl. No. 15/923,459, dated Jun. 21, 2023.

* cited by examiner

LIFECYCLE MANAGEMENT OF INDUSTRIAL AUTOMATION DEVICES

CROSS-REFERENCE TO RELATED PATENT APPLICATION

This application is a continuation of U.S. patent application Ser. No. 15/923,459 filed Mar. 16, 2018, the entire disclosure of which is incorporated by reference herein.

TECHNICAL BACKGROUND

Industrial automation is used to control machines and processes in manufacturing. Automated machines commonly control the handling of components, sub-components, and raw materials, perform fabrication processes, testing, product handling, packaging, and shipping. Industrial automation enables precise control of industrial processes, achievement of smaller tolerances and higher quality products, higher production outputs, and increased worker safety and productivity.

Industrial automation environments comprise multiple computerized devices that control industrial machines and industrial processes. The components of an industrial automation environment must work together in a coordinated fashion, performing operations such as exchanging data, controlling the timing and scheduling of processes, providing information to operators or technicians, and receiving operator inputs.

Industrial automation environments commonly include hundreds of machines and other components. Each machine may contain multiple devices. Each device is somewhere along its industrial lifecycle from "active" to "active mature" to "discontinued" to "end of life." After "end of life," the device is outdated, and most likely no longer supported by the manufacturer. If a "discontinued" or "end of life" device fails, and there is no readably available spare, it may be difficult or impossible to determine a compatible replacement for the device.

Overview

In an embodiment, a method for managing device lifecycles within an industrial automation environment. The method includes receiving a scanning configuration and a request for lifecycle management data through a user interface, and based on the scanning configuration, scanning a plurality of industrial devices within the industrial automation environment to produce configuration data for the industrial automation environment.

The method also includes transferring the configuration data and the request for lifecycle management data to a product compatibility and download center through a communication interface, receiving lifecycle management data from the product compatibility and download center through the communication interface, and displaying the lifecycle management data to a user through the user interface.

In another embodiment, one or more non-transitory computer-readable media having stored thereon program instructions to facilitate managing device lifecycles within an industrial automation environment comprising a plurality of industrial machines, each machine comprising one or more industrial devices. The program instructions, when executed by a computing system, direct the computing system to at least receive a scanning configuration and a request for lifecycle management data through a user interface, and based on the scanning configuration, scan a plurality of industrial devices within the industrial automation environment to produce configuration data for the industrial automation environment.

The program instructions further direct the computing system to at least transfer the configuration data and the request for lifecycle management data to a product compatibility and download center through a communication interface, receive lifecycle management data from the product compatibility and download center through the communication interface, and to display the lifecycle management data to a user through the user interface.

In a further embodiment, a method for managing device lifecycles within an industrial automation environment comprising a plurality of industrial machines, each machine comprising one or more industrial devices, is provided. The method includes receiving configuration data and a request for lifecycle management data through a communication interface, wherein the configuration data includes configuration data for a plurality of industrial devices within the industrial automation environment, based on a scanning configuration.

The method also includes determining lifecycle management data for each of the plurality of industrial devices within the industrial automation environment, based on the configuration data, and transferring the lifecycle management data to a server through the communication interface.

This Overview is provided to introduce a selection of concepts in a simplified form that are further described below in the Technical Disclosure. It should be understood that this Overview is not intended to identify key features or essential features of the claimed subject matter, nor is it intended to be used to limit the scope of the claimed subject matter.

DETAILED DESCRIPTION

Figure 1:
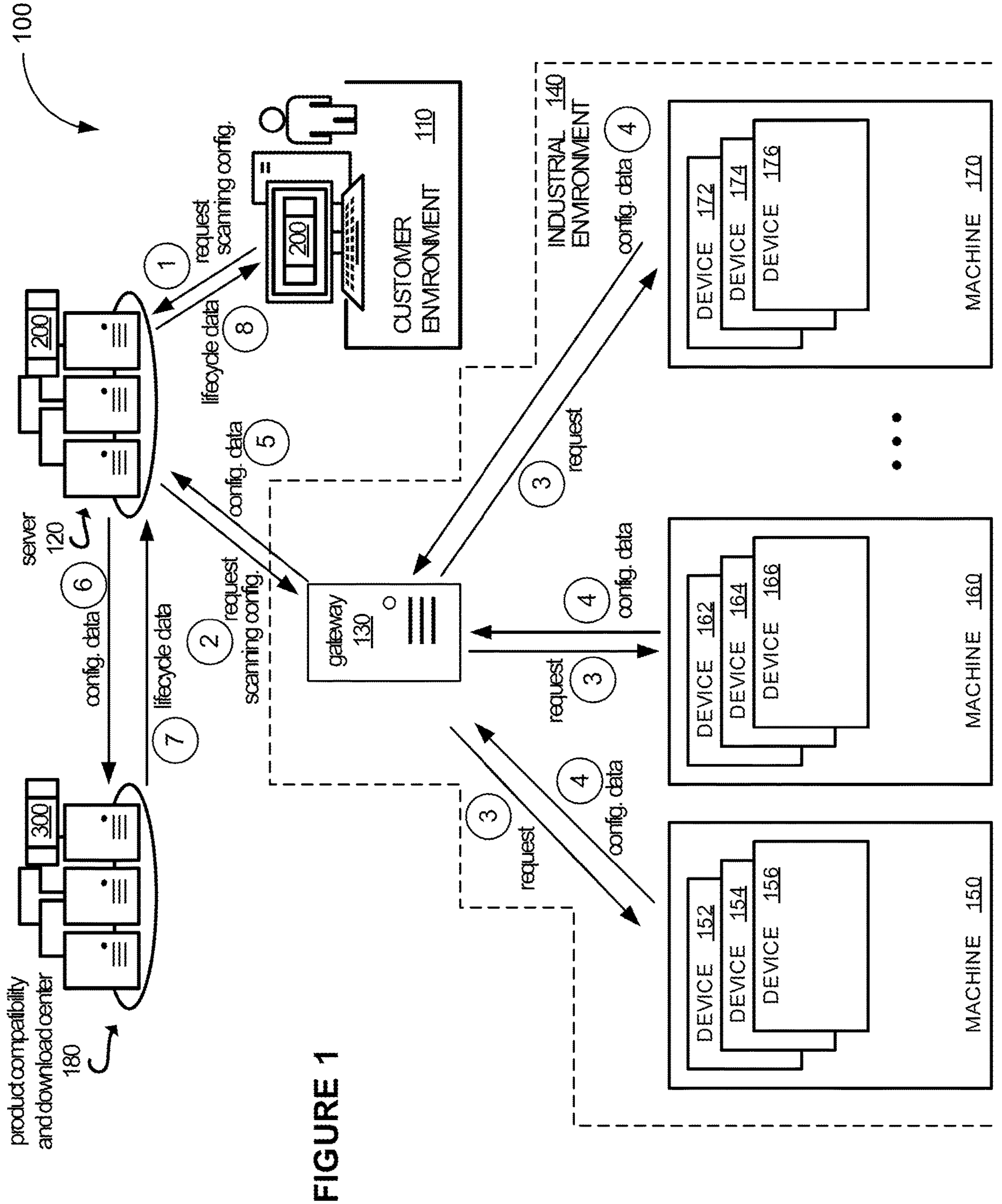
FIG. 1 illustrates an exemplary industrial automation system including a server for managing industrial device lifecycles within an industrial automation environment.

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by claims and their equivalents.

The number of devices in an automation system has increased, with some machines including hundreds of devices. Each device is somewhere along its industrial lifecycle from "active" to "active mature" to "discontinued" to "end of life." Other example embodiments may use different quantities and names of phases within an industrial lifecycle, these four phases and their names are simply examples. After "end of life," the device is outdated, and most likely no longer supported by the manufacturer. If a "discontinued" or "end of life" device fails, and there is no readably available spare, it may be difficult or impossible to determine a compatible replacement for the device.

Within large industrial automation environments, various devices may become "discontinued" or "end of life" without notice to the owners and operators. If one of these devices were to fail and no replacement is available, the entire industrial automation environment may shut down.

This invention provides the ability to launch scans of industrial automation environments to determine their device configuration and to determine the lifecycle status of each device. The user may be presented with the identity of replacement devices for industrial devices that are "discontinued" or "end of life" within their industrial automation environment.

It includes an application with a graphical user interface for allowing users to visualize the lifecycle of each device within their environment, and optionally to receive replacement information for devices nearing the end of their lifecycle.

Providing the ability to determine devices' lifecycle is a basic capability that many have. However, this is an extension that allows users to automatically collect configuration data from all or part of an industrial automation environment at a selected frequency (perhaps once a month), and to visualize the lifecycle status of each device in their environment quickly and easily.

Previously, a user would have to manually check the lifecycle status of one device at a time via an interface to a product compatibility and download center. In some cases, the user may not even be aware of the current configuration of all machines within their industrial environment, as other engineers may modify and/or upgrade machines without their knowledge.

In an example embodiment of the present invention, a product compatibility and download center is a server containing detailed information about all of the various possible industrial devices within any industrial environment. This information may include data sheets, lifecycle data, operating information, firmware revisions, and the like. The product design and download center may be a single server, spread among multiple servers, a cloud application, or any other configuration that stores and makes available product information.

The invention described herein provides more flexibility by allowing a user to automatically determine the configuration of any or all industrial devices within their automation environment, and to receive lifecycle data for each of these devices, and to receive identities of replacement devices for their industrial devices that are nearing or at the end of their lifecycle.

The invention may include a web application and related services running in the cloud for managing lifecycle data for industrial automation devices connected to an on-premise gateway, or a mobile application and related services for managing lifecycle data for industrial automation devices connected to an on-premise gateway.

FIG. 1 shows an exemplary industrial automation system 100 including a server 120 for managing device lifecycles. Industrial automation system 100 includes, customer environment 110, server 120, product compatibility and download center 180, gateway 130, and a plurality of industrial components within industrial automation environment 140.

In this example, each industrial machine 150, 160, and 170 include three devices. Machine 150 includes devices 152, 154, and 156; machine 160 includes devices 162, 164, and 166; and machine 170 includes devices 172, 174, and 176. Other examples may include any number of industrial machines, with each industrial machine including any number of industrial devices.

While this example illustrates a system including a single industrial automation environment 140, other examples may include multiple industrial automation environments which may by distributed in a plurality of geographic locations.

In this example, each industrial device has a model name and/or a model number, a serial number, and a firmware version number. These identifiers are used by product compatibility and download center 180 to determine where each industrial device is on its lifecycle.

In one example of the present invention, a user at customer environment 110 may (1) send a request schedule and a scanning configuration to server 120. The request schedule may include one or more requests for lifecycle data for industrial environment 140. For example, the user may request that server 120 request lifecycle data for industrial environment 140 every week, month, year, or other interval of time. Also, the user may make a single, non-repeating request for lifecycle data.

The scanning configuration instructs server 120 and gateway 130 on which machines and devices within industrial environment 140 are to be scanned. For example, the user may only wish to receive lifecycle data for the devices within machines 150 and 160, and not from machine 170. The scanning configuration provides several different ways for the user to specify which machines and devices to scan and is discussed in detail below with respect to FIG. 5.

In response to the request schedule, server 120 (2) sends the scanning configuration and a request for configuration data to gateway 130 within industrial environment 140. In response to the request for configuration data, gateway 130 (3) sends requests for configuration data to each machine 150, 160, and 170 within industrial environment 140.

In response to this request for configuration data, machines 150, 160, and 170 (4) send configuration data for each device they include back to gateway 130. For example, machine 150 (4) sends configuration data for devices 152, 154, and 156, while machine 160 (4) sends configuration data for devices 162, 164, and 166, and machine 170 (4) sends configuration data for devices 172, 174, and 176. Gateway 130 (5) forwards this configuration data to server 120.

Server 120 then (6) forwards the configuration data along with the request for lifecycle data to product compatibility and download center 180. Product compatibility and download center 180 determines lifecycle data for each of the devices within each of the machines within industrial environment 140, and then (7) transfers the lifecycle data to server 120. Server 120 then (8) forwards the lifecycle data to the user at customer environment 110.

Note that in other examples, industrial machines may include any number and combination of devices, drives, and controllers. FIG. 1 is a simplified example for purposes of clarity in understanding this method.

Figure 2:
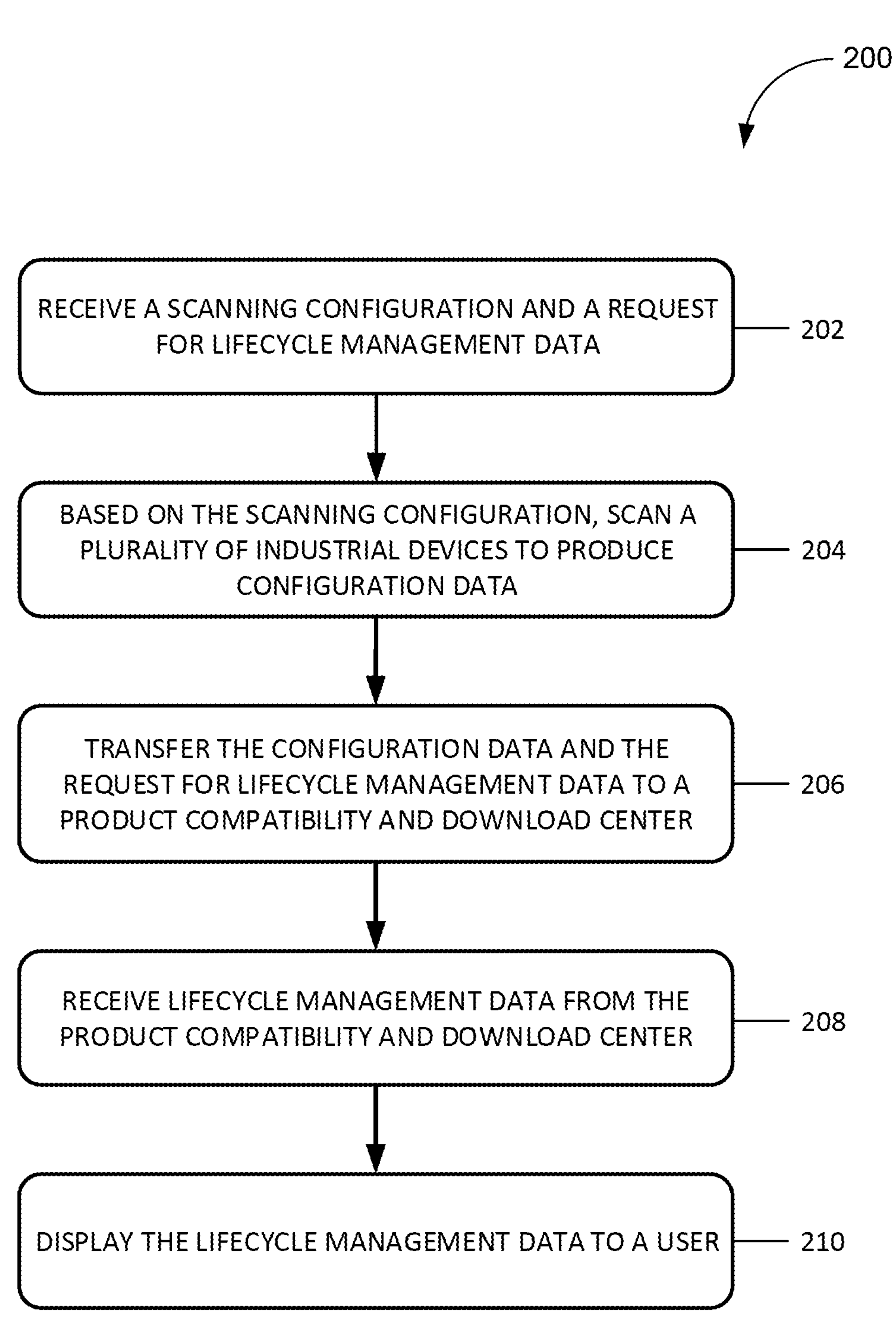
FIG. 2 illustrates an exemplary flowchart of a process for managing industrial device lifecycles within an industrial automation environment.

FIG. 2 illustrates an exemplary flowchart of a process 200 for managing industrial device lifecycles within an industrial automation environment comprising a plurality of industrial components, such as industrial automation system 100 from FIG. 1. In this example, industrial automation environment 140 includes gateway 130 coupled with the plurality of industrial machines (150, 160, and 170), and configured to communicate with the plurality of industrial machines and server 120.

In this example lifecycle management process 200, server 120 receives a scanning configuration and a request for lifecycle management data through a user interface from a device such as customer environment 110, (operation 202). Based on the scanning configuration, server 120, and/or gateway 130 scans a plurality of industrial machines and devices within industrial automation environment 140 to produce configuration data, (operation 204).

Server 120 transfers the configuration data and the request for lifecycle management data to product compatibility and download center 180, (operation 206). Server 120 then receives lifecycle management data from product compatibility and download center 180, (operation 208), and displays the lifecycle management data to a user through a user interface, (operation 210).

Figure 3:
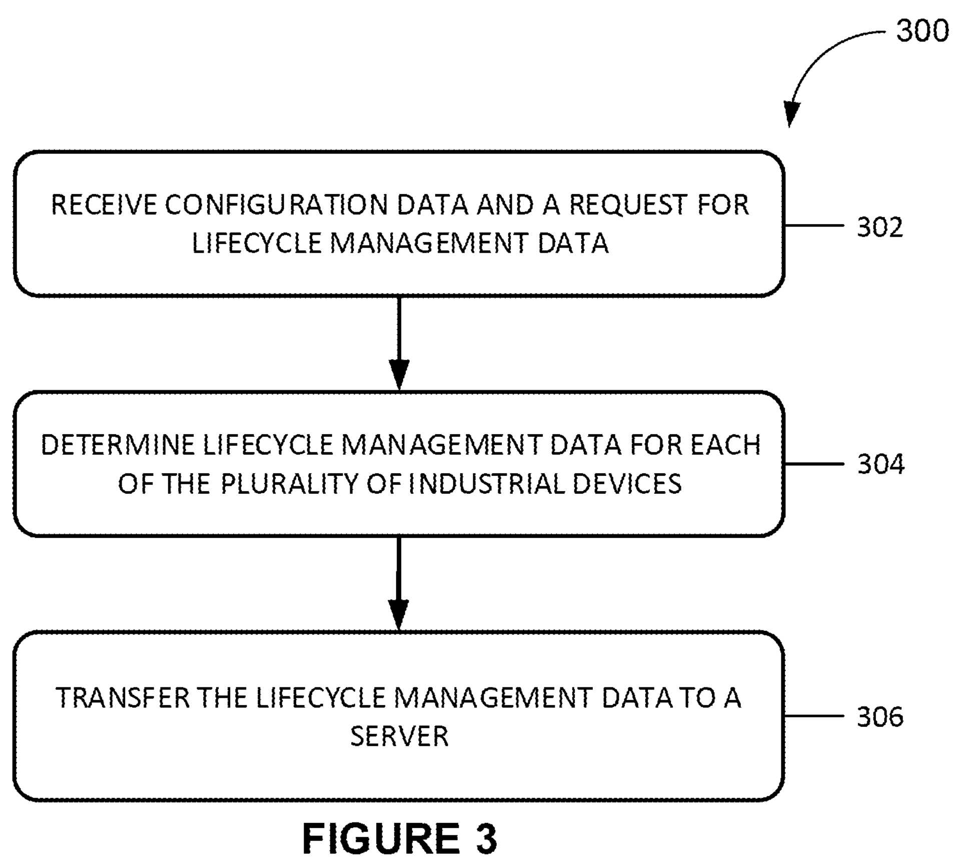
FIG. 3 illustrates an exemplary flowchart of a process for managing industrial device lifecycles within an industrial automation environment.

FIG. 3 illustrates an exemplary flowchart of a process 300 for managing industrial device lifecycles within an industrial automation environment comprising a plurality of industrial components, such as industrial automation system 100 from FIG. 1.

In this example, an application (update process 300) is running on product compatibility and download center 180. Product compatibility and download center 180 receives configuration data and a request for lifecycle management data through a communication interface, (operation 302). The configuration data includes the configuration of one or more machines (150, 160, or 170) within industrial environment 140, along with the configuration of one or more devices within the machines. This configuration data may include a product name and/or product number, serial number, firmware version number, and the like for each of the industrial devices.

Based on the configuration data, product compatibility and download center 180 determines lifecycle management data for each of the industrial devices, (operation 304), and transfers the lifecycle management data to server 120, (operation 306).

Figure 4:
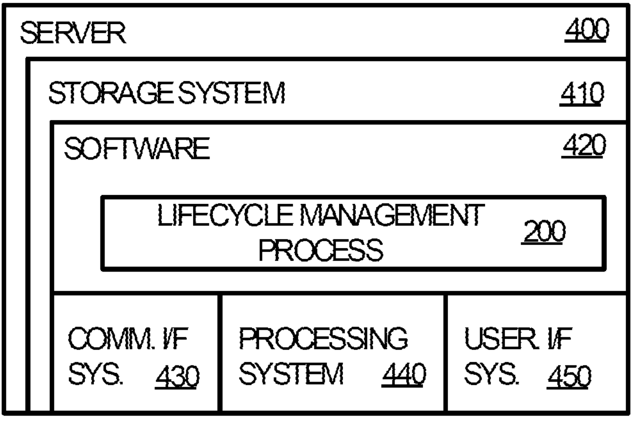
FIG. 4 illustrates an exemplary server or customer device for managing industrial device lifecycles within an industrial automation system.

FIG. 4 illustrates an exemplary server 400, such as server 120 from FIG. 1, or an exemplary customer device, such as customer environment 110 from FIG. 1, within an industrial automation system, such as industrial automation system 100 from FIG. 1.

Server or customer environment 400 includes user interface system 450, communication interface system 430, processing system 440, and storage system 410. Storage system 410 in the example shown includes software 420. In some examples, software 420 comprises lifecycle management process 200 that configures the server or customer environment 400, when executed by the server or customer environment 400 in general or processing system 440 in particular, to direct server or customer environment 400 to perform industrial automation operations, such as managing industrial device lifecycles as illustrated in FIG. 2. Other data, such as configuration data and lifecycle data, is also stored in storage system 410. Configuration data may include product names and/or product numbers, serial numbers, and firmware version numbers, or the like as described herein.

Processing system 440 may comprise a microprocessor and other circuitry that retrieves and executes software 420 from storage system 410. Processing system 440 may be implemented within a single processing device, but may also be distributed across multiple processing devices or subsystems that cooperate in executing program instructions. Examples of processing system 440 include general purpose central processing units, application specific processors, and logic devices, as well as any other type of processing device, combinations, or variations.

Storage system 410 may comprise any computer readable storage media readable by processing system 440 and capable of storing software 420. Storage system 410 may include volatile and nonvolatile, removable and non-removable media implemented in any method or technology for storage of information, such as computer readable instructions, data structures, program modules, or other data. Storage system 410 may be independent from or integrated into processing system 440. Storage system 410 can comprise additional elements, such as a memory controller, capable of communicating with processing system 440. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the storage media a propagated signal.

In addition to storage media, in some implementations storage system 410 may also include communication media over which software 420 may be communicated internally or externally. Storage system 410 may be implemented as a single storage device but may also be implemented across multiple storage devices or sub-systems co-located or distributed relative to each other. Storage system 410 may comprise additional elements capable of communicating with processing system 440 or possibly other systems.

Software 420 may be implemented in program instructions and among other functions and may, when executed by processing system 440, direct processing system 440 to operate as described herein. In particular, the program instructions may include various components or modules that cooperate or otherwise interact to implement at least a portion of server or customer environment 400. The various components or modules may be embodied in compiled or interpreted instructions or in some other variation or combination of instructions. The various components or modules may be executed in a synchronous or asynchronous manner, in a serial or in parallel, in a single threaded environment or multi-threaded, or in accordance with any other suitable execution paradigm, variation, or combination thereof. Software 420 in the examples comprises computer programs, firmware, or some other form of machine-readable processing instructions. Software 420 may include an operating system, utilities, drivers, network interfaces, applications, virtual machines, or some other type of software. Software 420 may include additional processes, programs, or components, such as operating system software or other application software. Software 420 may also comprise firmware or some other form of machine-readable processing instructions executable by processing system 440.

In general, software 420, when loaded into processing system 440 and executed, may transform a suitable apparatus, system, or device from a general-purpose computing system into a special-purpose computing system customized to assist in updating industrial automation controller firmware, among other operations. Indeed, encoding software 420 on storage system 410 may transform the physical structure of storage system 410. The specific transformation of the physical structure may depend on various factors in different implementations of this description. Examples of such factors may include, but are not limited to the technology used to implement the storage media of storage system 410 and whether the computer-storage media are characterized as primary or secondary storage, as well as other factors.

User interface system 450 may include communication connections and devices that allow for communication with users over a communication network or collection of networks. User interface system 450 may include user input and output devices for being controlled by a user, or these devices may be external to server or customer environment 400.

User interface system 450 may comprise a network card, network interface, port, or interface circuitry that allows server or customer environment 400 to communicate over a network or networks. User interface system 450 may also include a memory device, software, processing circuitry, or some other device. User interface system 450 can use any suitable communication protocol to exchange communications with a user.

User interface system 450 may include components that communicate over communication links, such as network cards, ports, RF transceivers, processing circuitry and software, or other communication components. User interface system 450 may be configured to communicate over electrically conductive, wireless, optical, or other links.

User interface system 450 can further include components that interact with a user to receive user inputs and user communications and to present media and/or information. These components typically include a keyboard, display, indicator lights, speakers, touch pads, microphone, buttons, mouse, or other user input/output apparatus, including combinations thereof.

Communication interface system 430 may include communication connections and devices that allow for communication with computers, such as product compatibility and download center 130, over a communication network or collection of networks.

Communication interface system 430 may comprise a network card, network interface, port, or interface circuitry that allows server or customer environment 400 to communicate over a network or networks. Communication interface system 430 may also include a memory device, software, processing circuitry, or some other device. Communication interface system 430 can use any suitable communication protocol to exchange communications with another computer.

Communication interface system 430 may include components that communicate over communication links, such as network cards, ports, RF transceivers, processing circuitry and software, or other communication components. Communication interface system 430 may be configured to communicate over electrically conductive, wireless, optical, or other links.

Figure 5:
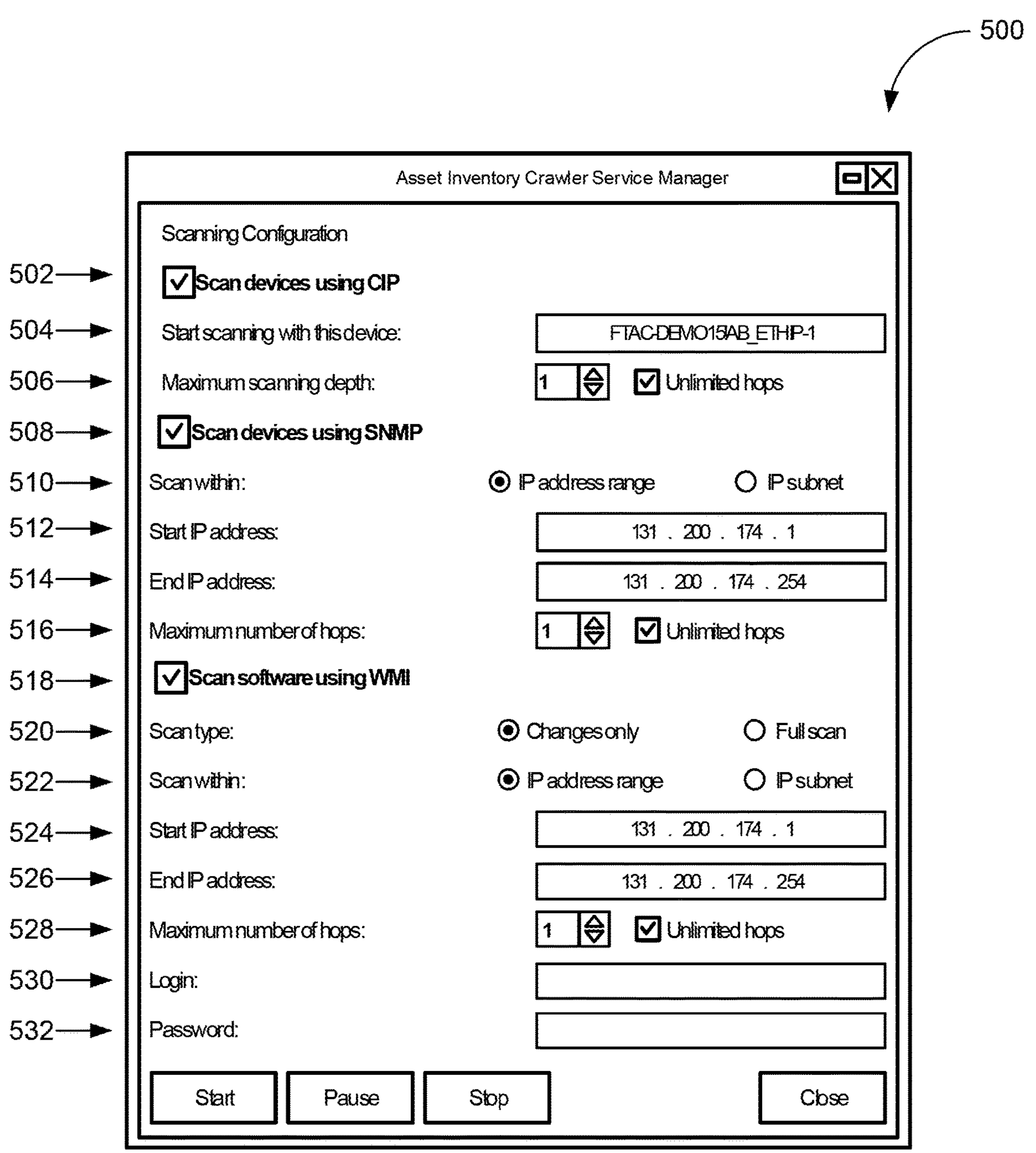
FIG. 5 illustrate an exemplary user interface for setting a scanning configuration for managing industrial device lifecycles within an industrial automation environment.

FIG. 5 illustrate an exemplary user interface 500 for setting a scanning configuration for managing industrial device lifecycles within an industrial automation environment. In this example, a user may select from three different types of scanning configurations in order to specify which machines and devices within industrial environment 140 are to be scanned. A user may scan devices using an Industrial Protocol such as Common Industrial Protocol (CIP) 502, Simple Network Management Protocol (SNMP) 508, and/or Windows Management Instrumentation (WMI) 518.

CIP allows a user to scan industrial devices over Ethernet/Internet Protocol, ControlNet, DeviceNet, DH+, and the like. SNMP allows the user to scan devices such as network switches. WMI allows the user to scan Windows based PCs and workstations. When selecting one or more of these protocols, the user then configures the scan using interface elements within user interface 500.

For example, when the user elects to scan devices using CIP 502, the user is prompted 504 to select a device as a starting point, and also prompted 506 to set a maximum scanning depth, or allow for unlimited hops. In this example, each EN2T module defines a scanning level.

When the user elects to scan devices using SNMP 508, the user is prompted 510 to select whether to scan based on an Internet Protocol (IP) address range or subnet. If the user elects to scan within an IP address range, the user is prompted 512 to enter a starting IP address, and also prompted 514 to enter an ending IP address. The user is also prompted 516 to enter the maximum number of hops to allow, or to allow unlimited hops. A layer three device, such as a router, defines a hop in this example.

When the user elects to scan devices using WMI 518, the user is prompted 520 to select whether to scan only for changes, or to perform a full scan. The user is also prompted 522 to select whether to scan based on an Internet Protocol (IP) address range or subnet. If the user elects to scan within an IP address range, the user is prompted 524 to enter a starting IP address, and also prompted 526 to enter an ending IP address. The user is also prompted 528 to enter the maximum number of hops to allow, or to allow unlimited hops. A layer three device, such as a router, defines a hop in this example. The user is then prompted 530 to provide an Admin username/login and also prompted 532 to provide the Admin password.

Figure 6:
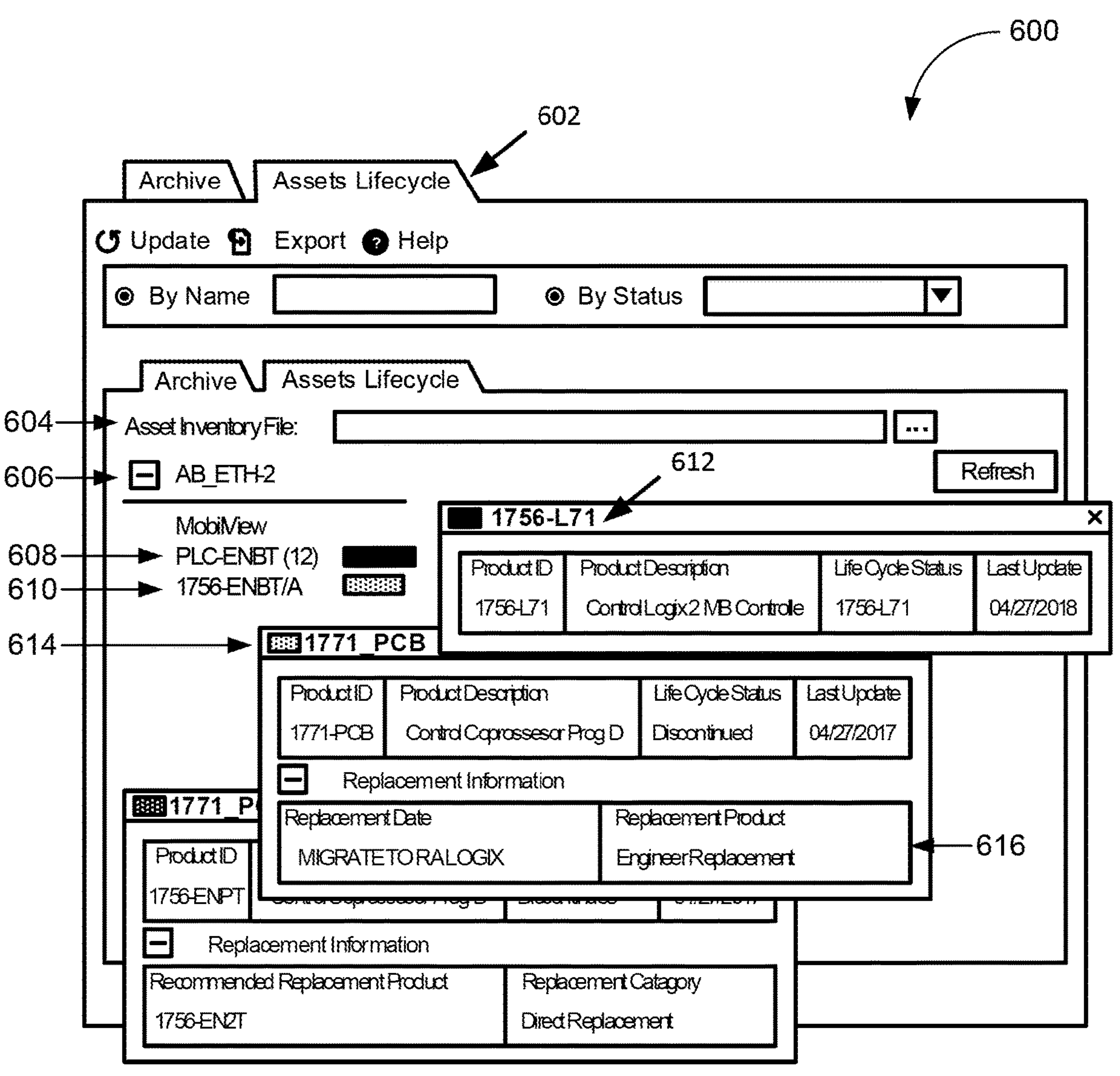
FIG. 6 illustrate an exemplary user interface for managing industrial device lifecycles within an industrial automation environment.

FIG. 6 illustrate an exemplary user interface 600 for managing industrial device lifecycles within an industrial automation environment. This example user interface 600 is provided to the user as a textual and graphical representation of the lifecycle status of various machines and devices within industrial environment 140. In this example, an "Assets Lifecycle" tab 602 is provided. This tab 602 includes a prompt 604 for the user to enter or select a file where the asset inventory is to be stored. The tab also provides the user an identification of a machine 606 within industrial environment 140, and in this example, two devices 608 and 610 within that machine. A color/shading coded rectangle next to each device name graphically illustrates a lifecycle phase in which each device currently resides.

In this example, device PLC-ENBT(12) 608 comprises product number 1756-L71, and by clicking on the device 608, window 612 appears showing the Product ID, Product Description, Lifecycle Status, and Last Update for that device. Also, in this example, device 1756-ENBT/A 610 comprises product number 1771-PCB, and by clicking on the device 610, window 614 appears showing the Product ID, Product Description, Lifecycle Status, and Last Update for that device. In this case, since the device has a lifecycle status of "Discontinued," window 614 also displays replacement information 616. In this example, an Engineer Replacement by migrating to a different device is recommended. Note that this is simply one example of user interface 600, other configurations will include various other devices, with their corresponding lifecycle data.

This example user interface 600, allows a user to quickly and easily see the lifecycle status of all devices within industrial environment 140 that were included within the scanning configuration defined by the user. These scans may be repeated automatically at intervals of time selected by the user, and allow the user to pre-emptively replace "discontinued" and "end of life" devices before they fail.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for managing device lifecycles within an industrial automation environment comprising a plurality of industrial devices, the method comprising:

receiving, from a user through a user interface, a request for lifecycle management data including a scanning configuration specifying one or more industrial devices of the plurality of industrial devices to be scanned and a pre-determined time interval to repeat the request;

in response to receiving the request for lifecycle management data, producing configuration data for the industrial automation environment obtained by scanning the one or more industrial devices specified by the scanning configuration;

receiving lifecycle management data comprising a lifecycle phase for the one or more industrial devices;

generating, on the user interface, a graphical representation of the lifecycle phase of the one or more industrial devices;

in response to the lifecycle phase of a first industrial device of the one or more industrial devices matching a predetermined lifecycle phase, determining an identity of a replacement device for the first industrial device, wherein the replacement device has a different product identifier than the first industrial device;

generating, on the user interface, a graphical representation of replacement information comprising the identity of the replacement device; and managing migration to the replacement device by initiating replacement of the first industrial device with the replacement device.

2. The method of claim 1, further comprising generating the lifecycle management data comprising the lifecycle phase for the one or more industrial devices based on the configuration data obtained by scanning the one or more industrial devices.

3. The method of claim 1, wherein the lifecycle phase of the one or more industrial devices comprises one or more of an active lifecycle phase, an active mature lifecycle phase, a discontinued lifecycle phase, or an end of life lifecycle phase;

wherein the predetermined lifecycle phase of the first industrial device comprises the discontinued lifecycle phase or the end of life lifecycle phase.

4. The method of claim 1, wherein generating the graphical representation of the replacement information comprising the identity of the replacement device is performed in response to an interaction with the graphical representation of the lifecycle phase of the first industrial device.

5. The method of claim 1, wherein the configuration data for the industrial automation environment comprises at least one of a product name, a product number, a firmware revision number, or a serial number for each the one or more industrial devices.

6. The method of claim 1, wherein the graphical representation of the replacement information comprises lifecycle data for the replacement device.

7. The method of claim 1, wherein the scanning configuration comprises at least one of:

a maximum scanning depth indicating a maximum number of hops allowed;

an Internet Protocol (IP) address range or subnet;

an instruction to scan only for configuration changes; or a method for scanning the plurality of industrial devices.

8. A system for managing device lifecycles within an industrial automation environment comprising a plurality of industrial devices, the system comprising:

one or more processors and one or more non-transitory computer-readable media storing instructions that, when executed by the one or more processors, cause the one or more processors to perform operations comprising:

receiving, from a user through a user interface, a request for lifecycle management data including a scanning configuration specifying one or more industrial devices of the plurality of industrial devices to be scanned and a pre-determined time interval to repeat the request;

in response to receiving the request for lifecycle management data, producing configuration data for the industrial automation environment obtained by scanning the one or more industrial devices specified by the scanning configuration;

receiving lifecycle management data comprising a lifecycle phase for the one or more industrial devices;

generating, on the user interface, a graphical representation of the lifecycle phase of the one or more industrial devices;

in response to the lifecycle phase of a first industrial device of the one or more industrial devices matching a predetermined lifecycle phase, determining an identity of a replacement device for the first industrial device, wherein the replacement device has a different product identifier than the first industrial device;

generating, on the user interface, a graphical representation of replacement information comprising the identity of the replacement device; and managing migration to the replacement device by initiating replacement of the first industrial device with the replacement device.

9. The system of claim 8, the operations further comprising generating the lifecycle management data comprising the lifecycle phase for the one or more industrial devices based on the configuration data obtained by scanning the one or more industrial devices.

10. The system of claim 8, wherein the lifecycle phase of the one or more industrial devices comprises one or more of an active lifecycle phase, an active mature lifecycle phase, a discontinued lifecycle phase, or an end of life lifecycle phase;

wherein the predetermined lifecycle phase of the first industrial device comprises the discontinued lifecycle phase or the end of life lifecycle phase.

11. The system of claim 8, wherein generating the graphical representation of the replacement information comprising the identity of the replacement device is performed in response to an interaction with the graphical representation of the lifecycle phase of the first industrial device.

12. The system of claim 8, wherein the configuration data for the industrial automation environment comprises at least one of a product name, a product number, a firmware revision number, or a serial number for each the one or more industrial devices.

13. The system of claim 8, wherein the graphical representation of the replacement information comprises lifecycle data for the replacement device.

14. The system of claim 8, wherein the scanning configuration comprises at least one of:

a maximum scanning depth indicating a maximum number of hops allowed;

an Internet Protocol (IP) address range or subnet;

an instruction to scan only for configuration changes; or a method for scanning the plurality of industrial devices.

15. One or more non-transitory computer-readable media storing instructions for managing device lifecycles within an industrial automation environment comprising a plurality of industrial devices, wherein the instructions, when executed by one or more processors, cause the one or more processors to perform operations comprising:

receiving, from a user through a user interface, a request for lifecycle management data including a scanning configuration specifying one or more industrial devices of the plurality of industrial devices to be scanned and a pre-determined time interval to repeat the request;

in response to receiving the request for lifecycle management data, producing configuration data for the industrial automation environment obtained by scanning the one or more industrial devices specified by the scanning configuration;

receiving lifecycle management data comprising a lifecycle phase for the one or more industrial devices;

generating, on the user interface, a graphical representation of the lifecycle phase of the one or more industrial devices;

in response to the lifecycle phase of a first industrial device of the one or more industrial devices matching a predetermined lifecycle phase, determining an identity of a replacement device for the first industrial device, wherein the replacement device has a different product identifier than the first industrial device;

generating, on the user interface, a graphical representation of replacement information comprising the identity of the replacement device; and managing migration to the replacement device by initiating replacement of the first industrial device with the replacement device.

16. The non-transitory computer-readable media of claim 15, the operations further comprising generating the lifecycle management data comprising the lifecycle phase for the one or more industrial devices based on the configuration data obtained by scanning the one or more industrial devices.

17. The non-transitory computer-readable media of claim 15, wherein the lifecycle phase of the one or more industrial devices comprises one or more of an active lifecycle phase, an active mature lifecycle phase, a discontinued lifecycle phase, or an end of life lifecycle phase;

wherein the predetermined lifecycle phase of the first industrial device comprises the discontinued lifecycle phase or the end of life lifecycle phase.

18. The non-transitory computer-readable media of claim 15, wherein generating the graphical representation of the replacement information comprising the identity of the replacement device is performed in response to an interaction with the graphical representation of the lifecycle phase of the first industrial device.

19. The non-transitory computer-readable media of claim 15, wherein the configuration data for the industrial automation environment comprises at least one of a product name, a product number, a firmware revision number, or a serial number for each the one or more industrial devices.

20. The non-transitory computer-readable media of claim 15, wherein the graphical representation of the replacement information comprises lifecycle data for the replacement device.

* * * * *